United States Patent [19]
Junkin et al.

[11] 3,855,170
[45] Dec. 17, 1974

[54] POWDER-RESISTANT ACRYLIC POLYMER FLOOR FINISHES

[75] Inventors: James H. Junkin, Oakland, Calif.; Martin E. Ginn, Park Forest; Ernest T. Fronczak, Crystal Lake, both of Ill.

[73] Assignee: Alberto-Culver Company, Melrose Park, Ill.

[22] Filed: Dec. 14, 1973

[21] Appl. No.: 424,698

Related U.S. Application Data

[63] Continuation-in-part of Ser. No. 331,238, Feb. 9, 1973, abandoned.

[52] U.S. Cl............ 260/29.6 RW, 117/161 UZ, 117/161 UT, 117/161 UC, 260/29.6 RB, 260/29.6 WB, 260/23 R, 260/901
[51] Int. Cl. ............................................ C08f 37/18
[58] Field of Search......... 260/23 R, 22 R, 29.6 RB, 260/29.6 RW, 29.6 WB, 901

[56] References Cited
UNITED STATES PATENTS

| | | | |
|---|---|---|---|
| 3,467,610 | 9/1969 | Fiarman et al. | 260/22 R |
| 3,541,037 | 11/1970 | Finn et al. | 260/29.6 RW |
| 3,573,239 | 3/1971 | Zdanowski | 260/22 R |
| 3,697,466 | 10/1972 | Sullivan et al. | 260/29.6 TA |

*Primary Examiner*—Melvin Goldstein
*Assistant Examiner*—W. Danison

[57] ABSTRACT

Acrylic resin floor finishes containing as the principal resin a zinc crosslinked acrylic polymer having a Knoop Hardness Number (KHN) from 13 to 19 are modified by incorporating minor proportions of a harder acrylic polymer, such as a methyl methacrylate polymer of a KHN hardness from 19 to 25, and a softer acrylic polymer, such as a copolymer of ethyl acrylate and methyl methacrylate of a KHN hardness below 5. Under adverse conditions of use, such as low temperature and low humidity, the finish has improved resistance to powdering.

12 Claims, No Drawings

3,855,170

POWDER-RESISTANT ACRYLIC POLYMER FLOOR FINISHES

CROSS-REFERENCE

This application is a continuation-in-part of copending application Ser. No. 331,238, filed Feb. 9, 1973, now abandoned.

BACKGROUND AND SUMMARY

In developing synthetic resin floor finishes, such as acrylic polymer finishes, which are resistant to wear, one recognized criteria is the relative resistance or lack of resistance of the finish to powdering, that is, to breaking down on the floor with the resultant formation of a fine powder on the surface. The tendency of a finish to "powder" is related not only to the extent of wear or abrasion but also to the ambient conditions. Adverse conditions which aggravate the problem of powdering are conditions of low temperature, low humidity, or both. Other desirable properties of such finishes are resistance to common soaps and detergents, and sufficient base solubility or dispersability, so it can be removed with aqueous ammonia systems.

Acrylic polymers and copolymers are the most commonly used class of film-forming resins in such floor finishes, providing finishes with adequate wear properties and clear films which are detergent-resistant but ammonia-sensitive. For improving wear resistance and particular resistance to powdering, zinc crosslinked acrylic polymers have been used as the principal film forming resins. However, under adverse conditions, such as low temperatures and/or low humidities, such floor finishes are still subject to objectionable powdering. Means for further improvement have been needed.

The present invention provides such a means. More specifically, it has been found that the resistance to powdering of a floor finish formulated with a zinc crosslinked acrylic polymer as the principal film forming resin can be substantially improved by incorporating a small amount of a harder acrylic resin together with a small amount of a softer acrylic resin. The improvement in powder resistance is believed to be due to the combined action of the hard and soft modifying acrylic polymers. Comparable results cannot be obtained with the zinc crosslinked polymers alone, or with such polymers plus either one but not both of the modifying polymers.

DETAILED DESCRIPTION

As already indicated, the present invention provides a means for significantly improving the resistance to powdering of aqueous emulsion floor finishes containing as the principal film forming resin a zinc crosslinked acrylic polymer. The improvement is obtained notwithstanding the fact that such acrylic polymers are known to provide excellent wear properties including resistance to powdering. Such floor finishes in aqueous emulsion form typically contain from 10 to 15% by weight of emulsion or solution polymers. In the formulations to which this invention is particularly directed, the zinc crosslinked acrylic polymers will comprise in excess of 50% by weight of the emulsion or solution polymers, and preferably at least 60% by weight of the polymers up to 85 to 90%.

The principal polymer component of the finishes can be further described as water-insoluble, but base-soluble, or at least ammonia-sensitive, and by being substantially resistant to ordinary soaps and detergents. For the purpose of the present invention, the most important characterizing property is the hardness of the film formed from the principal polymer. This may be expressed in terms of Knoop Hardness Number (KHN) as being in the range of 13 to 19. For example, the KHN can advantageously be at least 14 to 18. The term Knoop Hardness Number or KHN as used herein is intended to refer to ASTM Designation: D1474-62 T, issued 1959, revised 1962.

Providing the base polymer provides a KHN value within the prescribed ranges, the acrylic monomers used to form the polymer can vary considerably, as well as the amount of zinc compound or comparable reagent employed for the crosslinking. By way of example, however, such base polymers can be prepared by emulsion polymerization of at least one lower alkyl ester of acrylic acid, methacrylic acid, or mixtures of such esters of acrylic and methacrylic acids. Monomers employed to form the base resin may also include from 1 to 25% by weight based on the total monomers of acrylic acid, methacrylic acid, or mixtures thereof. More specifically, monomers may be subjected to emulsion polymerization wherein the respective weight percentages based on the total monomers are 50 to 80% of methyl methacrylate or other lower alkyl esters of methyl acrylic acid, 15 to 30% of ethyl or butyl acrylate, or other lower alkyl ester of acrylic acid, and 5 to 20% of methacrylic acid, or acrylic acid, or a mixture of methacrylic and acrylic acids.

The term "lower alkyl" as used herein is intended to refer to saturated alkyl groups of 1 to 4 carbon atoms, such as methyl, ethyl, propyl, or butyl, and does not include unsaturated alkylene groups such as ethylene, propylene, or butylene. Unless otherwise designated, the term "lower alkyl" in the specification and claims hereof shall be so understood.

Particularly suitable base polymers can be prepared by emulsion polymerization of a mixture of acrylic monomers consisting on a weight basis of 60 to 70% of methyl methacrylate (or other lower alkyl ester of methacrylic acid), 20 to 25% of ethyl or butyl acrylate, (or other lower alkyl ester of acrylic acid), and 10 to 15% of methacrylic acid (or mixture of methacrylic acid and acrylic acid, acrylic acid alone). Such polymers are available commercially from a number of manufacturers, including the Rohm and Haas Company of Philadelphia, Pa.

It is known that polyvalent metal compounds, such as polyvalent metal salts, oxides, and hydroxides, can be employed for crosslinking acrylic resin polymers. Such polyvalent metals include zinc, zirconium, cadmium, calcium, aluminum, barium, and the like. In commercial practice, zinc compounds are preferred to provide the zinc crosslinked acrylic polymers. For example, such zinc compounds may include complexes of zinc oxide with ammonium carbonate, or zinc chelates of bidentate amino ligands, such as those described in U.S. Pat. No. 3,467,610. The polyvalent metal crosslinkers can be employed in amounts of 0.1 to 10% based on the weight of the acrylic polymer. In commercial practice it will usually be preferred to employ about 1.0 to 3% by weight of the crosslinkers based on the polymer.

For the purpose of the present invention, the principal polymer, comprising the zinc crosslinked acrylic polymer as just described, is modified by formulating it with minor proportions of a harder acrylic polymer and a softer acrylic polymer. In general, amounts of from 1 to 10 parts by weight of each of the hard and soft modifying polymers are employed per 100 parts of the principal polymer. Particularly advantageous results may be obtained in the range of 3 to 7 parts each of the hard and soft acrylic polymers per 100 parts of the principal polymer.

The hard and soft acrylic polymers can be characterized by their KHN numbers. The hard polymer should have a KHN in the range of 19 to 25, such as a KHN of 20 up to 24. The soft polymer should have a KHN below 5, viz. within the range from 0.5 to 5, such as a KHN of at least 0.5 up to 2.

In terms of monomer content, the hard acrylic polymer is preferably prepared by emulsion polymerization of at least one lower alkyl ester of methacrylic acid. For example, a preferred monomer is methyl methacrylate. However, copolymers can also be used, such as copolymers of different lower alkyl esters of methyl acrylic acid. Such acrylic polymers are available commercially from a number of companies including the Rohm and Haas Company. Methyl methacrylate has sometimes been incorporated in floor finishes to impart anti-slip properties, but heretofore it is not known to provide an improvement in the resistance of the finish to powdering, nor has it been used in combination with a soft acrylic polymer of the kind which will now be described.

The soft acrylic polymer of the specified KHN number may be prepared by emulsion polymerization of one or more lower alkyl esters of acrylic acid, either alone, or in admixture with methacrylic acid, acrylic acid, or lower alkyl esters of methacrylic acid. For example, the soft acrylic polymer may be formed by subjecting a mixture of monomers to emulsion polymerization comprising a major weight portion of ethyl acrylate (or other lower alkyl acrylate) with a minor weight portion of methyl methacrylate (or other lower alkyl acrylate). More specifically, from 55 to 75% by weight of ethyl acrylate may be copolymerized with 25 to 45%. In addition, a third monomer may be included, such as 0.5 to 10% of methacrylic or acrylic acid. In a preferred embodiment 0.5 to 5% of methacrylic acid is included. Such soft acrylic polymers are available commercially from a number of companies including the Rohm and Haas Company.

Where the hard and soft acrylic polymers have KHN numbers within the ranges set out above, it will usually be advantageous to employ approximately equal proportions by weight of the hard and soft polymers, for example, one part by weight of the soft polymer for each part by weight of the hard polymer. However, exact weight proportions are not required providing there is a sufficient amount of the hard polymer present to overcome any residual tackyness of the soft polymer. In general, the hard polymer will usually be present in relative proportions within the range from 0.5 to 2 parts of the hard polymer for each part of the soft polymer. In preferred formulations, from 0.8 to 1.25 parts of the hard polymer can be employed per part of the soft polymer.

The complete formulation of the finish can include other minor ingredients as is well known in the art. With respect to other polymer or resin components, it will usually be desirable to include a small amount of a leveling resin, such as a styrene maleic anhydride resin. For example, from 10 to 15 parts by weight of the leveling resin can be present per 100 parts of the principal acrylic polymer. Further, it may be desirable to include a wax-type of polymer such as a polyethylene polymer. For example, from 8 to 12 parts by weight of a wax-type resin can be employed per 100 parts of the principal acrylic polymer. Other formulation ingredients, as are well known in the art, are illustrated by the following specific examples, but it should be understood that they do not constitute an essential part of formulations for practicing the present invention.

EXAMPLE I

The powder resistant floor finish of this invention is a unique combination in a water emulsion floor finish of acrylic polymer components.

The following is a description of the three acrylic polymer emulsions used in the preparation.

Emulsion A is a zinc crosslinked acrylic addition polymer emulsion obtained by copolymerization of the following monomers: 60–70% by weight methyl methacrylate, 20–25% ethyl or butyl acrylate, and 5–20% methacrylic acid. Emulsion polymerization as known in the art is employed. (See U.S. Pat. Nos. 3,328,325, 2,754,280, and 3,104,234.) The copolymer is crosslinked with from 1 to 3% by weight of the polymer of a zinc crosslinker compound, as described in U.S. Pat. No. 3,328,325. Emulsion A is 40% solids as added in the polish preparation. The KHN arrived at by ASTM Method No. D-1474-62T on the film shall be in the range of 14–18, viz. approximately 15–16.

Emulsion B is an acrylic addition polymer emulsion obtained by emulsion polymerization of methyl methacrylate or other lower alkyl methacrylate. Emulsion B is 38% solids as added in the polish preparation. The KHN arrived at on the film from this emulsion shall be 20–24, viz. approximately 22.

Emulsion C is an acrylic addition polymer emulsion obtained by emulsion copolymerization of the following monomers: 1.5–2.5 parts by weight of ethyl acrylate, 0.5 to 1.5 parts methyl methacrylate and 0.01 to 0.1 parts of methacrylic acid. Emulsion C is 46% solids as added in the polish preparation. The KHN arrived at on the film from this emulsion shall be 0.5–5.0, viz. approximately 1.0.

A suitable procedure for preparation for this polish system is:

1. Charge 32.206 parts of water into an agitator equipped kettle that has a heating/cooling jacket. The water is then heated to 130°–140° F. Turn off heat source.

2. Add 25.824 parts Emulsion A and mix for 5 minutes.

3. Add 0.7 parts 28% aqueous ammonia and mix for 10 minutes.

4. Premix 1.831 parts diethylene glycol monoethylether, 0.671 parts tributoxy ethyl phosphate and 0.817 parts 2-Pyrrolidone and stir until a clear, uniform mixture is obtained.

5. Add the mixed plasticizers slowly to the polymer solution and mix for 2 hours.

6. Cool the master batch by addition of 7.669 parts water and by use of cooling jacket.

7. Into a second steam jacketed kettle equipped with an agitator, charge 4.602 parts of softened water. Add with agitation 1.23 parts SMA 2625 resin. After the resin is dispersed, add 0.345 parts ammonia. Heat the mixture to 140°–150°F and continue agitation until a clear solution is obtained. Cool the resin solution to 90°–95°F. Add 2.025 parts water of dilution and stir for 10 minutes.

8. Add the resin solution to the main batch with stirring. 9. Charge 0.5578 parts of water to any convenient vessel and heat to 140°F. Then add 0.0086 parts of Tergitol NPX, stir until dissolved, followed by 0.0086 parts Defoamer A, and stir until completely dispersed.

10. Add the hot defoamer solution to the main batch with stirring.

11. Heat 0.977 parts AC-629 polyethylene in a steam jacketed kettle (240°–245°F until molten. Add with stirring 0.192 parts tall oil fatty acid and mix for 15 minutes. Add 0.192 parts morpholine and adjust the temperature to 255°–260°F. Mix the hot wax melt for 10–15 minutes, while the water in step 12 is being heated.

12. In a separate steam jacketed kettle equipped with an agitator, charge 6.301 parts softened water and heat to 210°–212°F. Add the wax melt at 255°–260°F slowly with rapid agitation. Continue agitation of the hot emulsion for 10 minutes after the addition of the wax melt.

13. Cool the batch as rapidly as possible to 95°F. by using cooling jacket or heat exchanger.

14. Add the emulsion to the main batch and stir for 15 minutes.

15. Charge 3.025 parts water into an agitator equipped vessel. Add 0.771 parts Igepal CO-995 with stirring and mix until the solution is uniform.

16. Add the stabilizer solution to the main batch with stirring.

17. Charge 1.001 parts Emulsion C and 1.201 parts Emulsion B along with 3.714 parts water into the product batch.

18. Into a kettle equipped with an agitator, charge 0.56925 parts softened water and heat to 125° F. Add 0.00575 parts FC-128 with agitation and continue agitating until a clear solution is obtained.

19. Add the leveling solution to the main batch and continue agitation.

20. In any convenient vessel charge 0.103 parts aqueous formaldehyde and dilute with 0.206 parts water.

21. Add the preservative solution to the main batch and continue agitation.

22. Add 3,247 parts water as determined by quality control to the main batch and mix for 30 minutes. The materials referred to above by trade names are:

| Trade Name | Chemical Name and Supplier |
|---|---|
| SMA 2625 Resin | Styrene — maleic-anhydride ester resin (Arco) |
| Tergitol NPX | Nonylphenyl polyethylene glycol ether (Union Carbide) |
| Defoamer A | Hydrophobic silicone defoamer (Diamond-Shamrock Chemical) |
| Igepal CO-995 | Nonylphenoxypoly (ethyleneoxy) ethanol (GAF) |
| FC-128 | Fluorocarbon Surfactant (3M Corp.) |

EXAMPLE II

Following the procedure of Example I, preferred acrylate polymer emulsions are prepared by emulsion polymerization of acrylate monomers as follows;

| Monomer | Weight % |
|---|---|
| Emulsion A | |
| Methyl methacrylate | 65% |
| Butyl acrylate | 23% |
| Methacrylic acid | 12% |
| Emulsion B | |
| Methyl methacrylate | 100% |
| Emulsion C | |
| Ethyl acrylate | 66% |
| Methyl methacrylate | 33% |
| Methacrylic acid | 1% |

The copolymer of Emulsion A is cross-linked with zinc as described in Example 1. If desired ethyl acrylate can be substituted for the butyl acrylate on an equal weight bases. The acrylate polymers formulated as set out should have film hardnesses of 15–17 KHN for the zinc cross-linked copolymer of Emulsion A, 21–23 KHN for the polymer of Emulsion B, and 0.5–1.5 KHN for the copolymer of Emulsion C.

EXAMPLE III

Having reference to the procedure of Example I, and the compositions of Emulsions A, B, and C as set out in Examples I and II, a modified formulation of a floor finish compounded in accordance with the present invention is as follows:

| % | Wt |
|---|---|
| Emulsion A | 25.00 |
| Aqueous Ammonia | 0.68 |
| Diethylene Glycol Monoethylether | 1.78 |
| Tributoxy Ethyl Phosphate | 0.65 |
| 2-Pyrrolidone | 0.794 |
| SMA 2625 Resin | 1.18 |
| Aqueous Ammonia | 0.33 |
| Tergitol NPX | 0.0084 |
| Defoamer A | 0.0084 |
| AC-269 Polyethylene | 0.947 |
| Tall Oil Fatty Acid | 0.188 |
| Morpholine | 0.188 |
| Igepal CO-995 | 0.752 |
| Emulsion C | 0.970 |
| Emulsion B | 1.160 |
| FC-128 | 0.0056 |
| Aqueous Formaldehyde | 0.100 |
| Total added water | 65.2586 |

EXAMPLE IV

As a further guide to formulating floor finishes in accordance with the present invention, the desirable proportions of the three acrylate polymers with respect to each other and with respect to minor synthetic resin ingredients, such as leveling resins and waxes, can be summarized as follows:

| Polymers in the Polish Film | Parts-Polymers, Waxes, Resins, in Total Polish Film | Range-Parts in Total Polish Film | % Range in Polish Film |
|---|---|---|---|
| | (Typical) | | |
| Polymers of Emulsion A | 10.33 | 9.63 to 11.03 | 76.0 to 78.1 |
| Polymers of Emulsion B | 0.46 | 0.40 to 0.50 | 3.0 to 3.4 |
| Polymers of Emulsion C | 0.46 | 0.40 to 0.50 | 3.0 to 3.4 |
| Styrene Maleic Anhydride Resin | 1.23 | 1.15 to 1.30 | 8.7 to 9.5 |
| Anionic Polyethylene Wax | 0.977 | 0.92 to 1.04 | 7.0 to 7.5 |
| | 13.457 | 12.50 to 14.37 | |

EXAMPLE V

A preferred floor finish formulation in accordance with the present invention can be compounded by the procedure set out in Example I, according to the following formulation of ingredients:

| % | Wt |
|---|---|
| Total Water Addition | 64.615 |
| Rhoplex B-60A | 1.248 |
| Rhoplex B-505 | 25.820 |
| Rhoplex B-85 | 1.493 |
| Shanco 60-121 Resin | 1.470 |
| Aqueous Ammonia, 28% | 0.440 |
| AC-629 Polyethylene | 0.980 |
| Pamak I (Hercules) | 0.190 |
| Morpholine | 0.190 |
| Diethylene Glycol Monoethylether | 1.000 |
| Tributoxy Ethyl Phosphate | 0.850 |
| 2-Pyrrolidone | 0.820 |
| Igepal CO-995 | 0.770 |
| FC-128 | 0.0063 |
| Formalin | 0.107 |
| SWS-211 Defoamer | 0.00035 |
| Victawet 12 | 0.00035 |
| | 100.000 |

Total Solids = 16.5 ± 0.2%
pH = 8.0 ± 0.2

The products identified above by tradenames, which are in addition to those tradename products identified at the end of Example I are further identified as follows:

Rhoplex B-60A, an acrylate emulsion polymer manufactured by Rohm and Haas Company with a KHN in the range of 0.5–2.

Rhoplex B-505, a base soluble, zinc-crosslinked aqueous acrylic polymer manufactured by Rohm and Haas Company with a KHN in the range of 14–18.

Rhoplex B-85, an aqueous dispersion of an acrylic polymer manufactured by Rohm and Haas Company with a KHN in the range of 20–24.

Shanco 60-121, a rosin modified polyester resin manufactured by Shanco Plastics and Chemicals, Inc.

AC-629, a modified polyethylene wax manufactured by Allied Chemical Company.

Pamak I, a tall oil fatty acid fraction high in oleic content manufactured by Hercules.

SWS-211, a synthetic defoamer manufactured by Stauffer Chemical Company.

Victawet 12, a synthetic wetting agent manufactured by Stauffer Chemical Company.

We claim:

1. An aqueous emulsion floor finish containing as the principal film forming polymer a zinc crosslinked acrylic polymer having a Knoop Hardness Number (KHN) of about 14 to 18, said principal polymer being suitable for use in a floor finish and having been prepared by the emulsion polymerization of a mixture of monomers selected from the group consisting of lower alkyl esters of acrylic acid, methacrylic acid, or mixtures thereof, or at least one of said esters together with a minor proportion of acrylic acid, methacrylic acid or mixtures thereof, said floor finish having incorporated therein in combination with said principal polymer the following modifying polymers:

a. from 1 to 10 parts by weight per 100 parts of said principal polymer of a hard acrylic polymer having a KHN of 19 to 25, said hard acrylic polymer having been prepared by emulsion polymerization of at least one lower alkyl ester of methyacrylic acid; and b. from 1 to 10 parts by weight per 100 parts of said principal polymer of a soft acrylic polymer having a KHN of not over 5.0, said soft acrylic polymer having been prepared by emulsion polymerization of acrylate monomers selected from (i) at least one lower alkyl ester of acrylic acid and (ii) a mixture of (i) with at least one monomer selected from methacrylic acid, acrylic acid, and lower alkyl esters of methacrylic acid;

said hard polymer being present in relative proportions by weight of from 0.5 to 2 parts per each part of said soft polymer.

2. The floor finish of claim 1 in which said hard polymer has a KHN of 20 to 24 and said soft polymer has a KHN of 0.5 to 2.

3. The floor finish of claim 1 wherein said hard polymer and said soft polymer each employed in amounts of from 3 to 7 parts by weight per 100 parts of said principal polymer.

4. The floor finish of claim 3 in which said hard polymer is present in relative proportions by weight of from 0.8 to 1.25 parts per each part of said soft polymer.

5. The floor finish of claim 1 in which said hard polymer has a KHN of 20 to 24, said soft polymer has a KHN of 0.5 to 2, said hard and soft polymers are each employed in amounts of from 3 to 7 parts by weight per 100 parts of said principal polymers and said hard polymer is present in relative proportions by weight of from 0.8 to 1.25 parts per each part of said soft polymer.

6. An aqueous emulsion floor finish containing as the principal film forming polymer a zinc crosslinked acrylic polymer having a Knoop Hardness Number (KHN) within the range of 13 to 19, said principal polymer having been prepared by the emulsion polymerization of a mixture of monomers comprising on a weight basis to to 80% of methyl methacrylate, 15 to 30% of an alkyl acrylate selected from ethylacrylate or butylacrylate, and 5 to 20% of methacrylic acid, said principal polymer having been crosslinked with a zinc crosslinking reagent in an amount on the basis of the weight of said polymer before crosslinking of 1 to 3% of said crosslinking reagent, said floor finish having incorporated therein in combination with said principal polymer the following modified resins:

a. from 1 to 10 parts by weight per 100 parts of said principal resin of a hard acrylic polymer having a KHN of 20 to 24, said hard acrylic polymer having been prepared by emulsion polymerization of at least one lower alkyl ester of methacrylic acid; and b. from 1 to 10 parts by weight per 100 parts of said principal resin of a soft acrylic polymer having a KHN of 0.5 to 2, said soft acrylic polymer having been prepared by emulsion polymerization of acrylate monomers selected from (i) at least one lower alkyl ester of acrylic acid, and (ii) a mixture of (i) with at least one acid selected from methacrylic acid, acrylic acid, and lower alkyl esters of methacrylic acid;

said hard polymer being present in relative proportions by weight of from 0.5 to 2 parts per each part of said soft polymer.

7. The floor finish of claim 6 wherein said hard polymer and said soft polymer are each employed in amounts of 3 to 7 parts by weight per 100 parts of said principal resin.

8. The floor finish of claim 7 in which said hard polymer is present in relative proportions by weight of from 0.8 to 1.25 parts per each part of said soft polymer.

9. The floor finish of claim 6 in which said hard polymer has been prepared essentially from methyl methacrylate.

10. The floor finish of claim 6 in which said soft polymer has been prepared from a mixture of monomers on a weight basis consisting essentially 55 to 75% of ethyl acrylate, 25 to 45% of methyl methacrylate, and 0 to 5% of acid monomers selected from methacrylic acid, acrylic acid, and mixtures thereof.

11. The floor finish of claim 6 in which said alkyl acrylate monomer of said principal polymer if ethylacrylate.

12. An aqueous emulsion floor finish containing as the principal film forming resin a zinc crosslinked acrylic polymer having a Knoop Hardness Number (KHN) of 14 to 18, said principal resin having been prepared by the emulsion polymerization of a mixture of monomers comprising on a weight basis 60 to 70% of methyl methacrylate, 20 to 25% of an alkyl acrylate selected from ethyl acrylate or butyl acrylate, and 10 to 15% of methacrylic acid, said principal resin having been crosslinked with a zinc crosslinking reagent, said floor finish having incorporated therein in combination with said principal resin the following modified resins:

a. from 3 to 7 parts by weight per 100 parts of said principal resin of a hard acrylic polymer having a KHN of 20 to 24, said hard acrylic polymer having been prepared by emulsion polymerization of at least one lower alkyl ester of methacrylic acid; and b. from 3 to 7 parts by weight per 100 parts of said principal resin of a soft acrylic polymer having a KHN not over 5.0, said soft acrylic polymer having been prepared by emulsion polymerization of acid monomers selected from (i) at least one lower alkyl ester of acrylic acid, and (ii) a mixture of (i) with at least one acid selected from methacrylic acid, acrylic acid, and lower alkyl esters of methacrylic acid;

said hard polymer being present in relative proportions by weight of from 0.8 to 1.25 parts per each part of said soft polymer.

* * * * *